United States Patent
Enders

(10) Patent No.: US 6,846,010 B2
(45) Date of Patent: Jan. 25, 2005

(54) PRESSURE EQUALIZING CURTAIN AIRBAG

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/060,438

(22) Filed: Jan. 30, 2002

(65) Prior Publication Data
US 2003/0141708 A1 Jul. 31, 2003

(51) Int. Cl.$^7$ .......................... B60R 21/20; B60R 21/16
(52) U.S. Cl. ................. 280/730.2; 280/743.1; 280/729
(58) Field of Search .............................. 280/729, 730.2, 280/743.1

(56) References Cited

U.S. PATENT DOCUMENTS

| | | | |
|---|---|---|---|
| 5,588,672 A | | 12/1996 | Karlow |
| 6,135,492 A | * | 10/2000 | Zimmerbeutel et al. .. 280/730.2 |
| 6,135,493 A | * | 10/2000 | Jost et al. .................. 280/730.2 |
| 6,168,193 B1 | * | 1/2001 | Shirk et al. ............... 280/730.2 |
| 6,199,898 B1 | * | 3/2001 | Masuda et al. ........... 280/730.2 |
| 6,290,253 B1 | | 9/2001 | Tietze |
| 6,299,199 B1 | * | 10/2001 | Bowers et al. ............ 280/730.2 |
| 6,336,654 B1 | | 1/2002 | Stein |
| 6,343,811 B1 | * | 2/2002 | Hammer et al. .......... 280/730.2 |
| 6,343,844 B1 | | 2/2002 | McCann |
| 6,431,587 B1 | * | 8/2002 | O'Docherty .............. 280/730.2 |
| 6,431,590 B1 | * | 8/2002 | Bakhsh et al. ........... 280/730.2 |
| 6,450,529 B1 | * | 9/2002 | Kalandek et al. ........ 280/730.2 |
| 6,457,740 B1 | * | 10/2002 | Vaidyaraman et al. ... 280/730.2 |
| 6,471,240 B2 | * | 10/2002 | Bakhsh et al. ............... 280/729 |
| 6,474,678 B1 | * | 11/2002 | Boxey ...................... 280/728.2 |
| 6,502,853 B2 | * | 1/2003 | Keshavaraj ................. 280/729 |
| 6,502,857 B2 | * | 1/2003 | Nakanishi et al. ........... 280/740 |
| 6,520,534 B2 | * | 2/2003 | Ritter ....................... 280/730.2 |
| 6,554,314 B1 | * | 4/2003 | Uchiyama et al. ........ 280/730.2 |
| 2001/0024030 A1 | * | 9/2001 | O'Loughlin et al. ..... 280/730.2 |
| 2001/0035633 A1 | * | 11/2001 | Kobayashi et al. ....... 280/730.1 |
| 2002/0014762 A1 | * | 2/2002 | Bakhsh et al. ........... 280/730.2 |
| 2002/0036394 A1 | * | 3/2002 | Bakhsh et al. ........... 280/730.2 |
| 2002/0084633 A1 | * | 7/2002 | Heigl et al. .............. 280/730.2 |

FOREIGN PATENT DOCUMENTS

| | | |
|---|---|---|
| GB | 2327066 | 7/1997 |
| JP | 2001-163158 A * | 6/2001 |
| JP | 2001-171467 A * | 6/2001 |

* cited by examiner

Primary Examiner—Ruth Ilan
(74) Attorney, Agent, or Firm—Sally J. Brown

(57) ABSTRACT

An inflatable airbag cushion for protecting occupants of a vehicle in a side impact, rollover, or other crash situation is presented. The airbag cushion has at least two inflatable protection zones. Each protection zone is configured to protect an occupant in a different seat of the vehicle. An inflation channel receives pressurized gas from a source of pressurized gas and directs the gas into the inflatable airbag. Each protection zone is separated from any adjacent protection zones by a connection zone. At least one communication channel allows the pressurized gas to flow between the protection zones. The gas flow between protection zones allows the pressure within the separate protection zones to equalize. The airbag cushion may have three protection zones and is configured to protect an occupant of a vehicle having pillars A through D. The first, second, and third protecting zones for protecting an occupant seated in the front, middle, and rear seats of the vehicle respectively. Each protection zone is in fluid communication with the adjacent protection zones by a communication channel. The airbag cushion may be formed by two membranes joined together through one of many attachment mechanisms.

36 Claims, 6 Drawing Sheets

PRESSURE EQUALIZING CURTAIN AIRBAG

BACKGROUND OF THE INVENTION

1. Field of the Invention

The present invention relates to vehicular safety. More specifically, the present invention relates to a novel device for the equal distribution of inflation gases in an airbag cushion.

2. Technical Background

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield. Side impact airbags, also known as inflatable curtains, have been developed in response to the need for similar protection from impacts in a lateral direction, or against the side of the vehicle.

Despite their enormous lifesaving potential, the effectiveness of side impact airbags has been somewhat limited by the speed with which inflation gases are able to fill the cushion. Side impact cushions are often designed to unfold or unroll downward to inflate beside a person to keep the person from hitting the door or window during lateral impact. Since a vehicle occupant may be leaning forward, reclined in the seat, or at any position between, such cushions are often made somewhat long to ensure that the occupant hits the cushion.

Cushions for inflatable curtains are often inflated by an inflator positioned either fore or aft of the cushion. Consequently, unlike many front impact airbags, a long gas flow path exists between the inflator and the outermost extent of the cushion. The length of the gas flow path is problematic for a number of reasons.

One such reason is that the cushions are unable to inflate rapidly enough to provide optimal protection. Since most airbag systems are unable to detect a collision until impact has begun to occur, the airbag must move from an uninflated, stowed configuration to a fully inflated configuration within a small fraction of a second. The long flow path increases the time required by the inflation gases to traverse the cushion. Thus, the cushion may not obtain a fully inflated state before the vehicle occupant strikes the cushion.

In an attempt to compensate for the longer gas flow path, inflators with a higher "rise rate," or rate of pressure increase of expelled gases, and a higher volume of expelled gases, have been used. Unfortunately, when the inflation gases are more highly pressurized, there is a higher danger of damage to the cushion. Highly-pressurized gases produce stresses in the material of the cushion that may tend to rip the cushion material or split the cushion open along the seams, thereby jeopardizing the effectiveness of the cushion.

Furthermore, even when the inflator produces a larger amount of gas, the inflation gas may expand in the portion of the cushion nearest to the inflator, rather than continuing toward the furthest extents of the cushion. As a result, the cushion may not be uniformly inflated in time to properly shield occupants from impact.

Existing airbag configurations developed in an attempt to solve this problem also have some drawbacks. Some are difficult and/or expensive to manufacture, in part due to additional drilling, punching, aligning, fixturing and the like that must be carried out. Some increase the expense of airbag installation because they have parts that must be inserted into a finished cushion prior to installation of the cushion in a vehicle. Others require additional time to reach a steady state after inflation due to backflow and other continued motion of inflation gases within the cushion.

Currently available side impact airbag cushions are generally designed to protect only the passengers of the front seats and the seats directly behind the front seats. For example, in a vehicle with three seating areas such as a minivan or sport-utility vehicle, the side impact cushion only has protection zones for the front and middle seats. The occupants of the rear seat are not protected by the airbag cushion.

In an airbag cushion designed to protect passengers all three seating areas there may be a problem with uniform inflation of the cushion. Generally, long airbag cushions are inflated by a single inflator. Using a single inflator for all protection zones costs less than using multiple inflators for the cushion. Moreover, the use of one inflator reduces the risk of airbag malfunction. However, because the airbags use one inflator, there may be unequal pressure buildup in the protection zones. The pressure buildup can cause the cushion to inflate in a non-uniform manner.

Accordingly, a need exists for a side impact airbag cushion configured to protect occupants of all seats of a vehicle. In particular a need exists for an apparatus that can provide side impact protection for the occupants of the front, middle, and rear seats of a vehicle. Additionally a need exists for an apparatus and method for distributing inflation gases in an inflatable cushion in a comparatively uniform and rapid manner. A need further exists for such an apparatus and method that can be carried out with a minimum of added expense to the manufacture and installation of the cushion. Furthermore, a need exists for such an apparatus and method that is capable of rapidly equalizing the pressure within the protection zones of the airbag cushion.

BRIEF DESCRIPTION OF THE INVENTION

The apparatus of the present invention has been developed in response to the present state of the art, and in particular, in response to the problems and needs in the art that have not yet been fully solved by currently available inflatable airbag curtains.

Generally, an inflatable airbag cushion of the present invention is installable in a passenger vehicle. The airbag cushion may be installed within the vehicle to protect an occupant in the case of a lateral impact or other crash scenario where the occupant may impact the vehicle sides or windows. The airbag cushion may also protect the occupant in other types of crashes such a rollover.

The airbag cushion is configured to have at least two protection zones. The protection zones are inflated when a sensor detects an impact. An inflation channel receives pressurized gas from a source of pressurized gas and directs the gas into the protection zones. Each of the protection zones are joined to at least one other protection zone by a connection zone. The connection zones are sealed to prevent the flow of gas between the protection zones. Because the gas is contained within the protection zones, the protection zones inflate creating distinct protecting pillows. The protection zones may be divided into one or more chambers. Such chambers are partially sealed from adjacent chambers within the protection zone. The chambers may serve to give the airbag cushion more form and rigidity in the event of deployment.

Generally, the airbag inflation channel releases the pressurized gas into the airbag at one point. The point of the release of the gas may be near the front, back, or middle of the airbag cushion. This point specific release of the inflation gas may cause the gas to be unequally distributed in the various protection zones of the air bag cushion. Unequal distribution of the gas may cause varying pressures to build in each protection zone. The disparity in pressure may result in the airbag being unequally inflated or in the inflation of one protection zone lagging behind the inflation of another protection zone.

To overcome the problems associated with unequal distribution of inflation gases in the airbag and the associated pressure variations in the protection zones, a communication channel may connect one protection zone to another protection zone. The communication channel allows the pressurized inflation gas to flow from one protection zone to another thereby equalizing the pressure in the inflation zones. The communication channels can be placed in various positions. For example, the communication channels can be positioned proximate the bottom of the airbag cushion. The communication channel can also be positioned more toward the top of the airbag cushion. Two or more communication channels may connect one protection zone to another. When multiple communication channels connect two protection zones, one communication channel may be positioned toward the top of the airbag cushion and one communication channel may be positioned toward the bottom of the airbag cushion.

When the inflator is activated in a crash situation, the inflation gas travels from the inflator to the airbag cushion. A gas guide may be provided to direct the gas into the airbag cushion. In certain configurations, the gas guide is connected to the inflation channel. The gas guide may be configured to direct a predetermined portion of the inflation gas into a given protection zone. Using such a gas guide can help to overcome the problem of unequal pressure in the protection zones. The gas guide may also direct a predetermined portion of the inflation gas toward the front of the airbag cushion and another portion of the inflation gas toward the rear of the cushion. The gas guide may be configured to direct a substantially equal portion of the pressurized gas toward the front and the rear of the airbag cushion. Alternatively, the gas guide may direct a greater portion of the pressurized gas toward the front or the rear of the airbag cushion.

In longer vehicles, such as a passenger van or a sports utility vehicle, it may be desirable to have an airbag that runs from the A pillar of the vehicle to the D pillar of the vehicle. Such an airbag can provide protection to passengers in the front, middle, and rear seats of the vehicle. In such long airbags, each of the protection zones is separated from any adjacent protections zone by a connection zone. The connection zone does not allow the communication of the pressurized inflation gases between the protection zones. Airbag cushions for certain vehicles may have a long airbag cushion with three protection zones. Such long airbag cushions have a first protection zone, a second protection zone, and a third protection zone. Each protection zone separated from the adjacent protection zones by a connection zone. The first, second, and third protection zones protect passengers seated in the front, middle, and rear seats of the vehicle respectively. That is, the first protection zone is configured to protect a passenger seated between the A and B pillars of the vehicle, the second protection zone is configured to protect a passenger seated between the B and C pillars of the vehicle, and the third protection zone is configured to protect a passenger seated between the C and D pillars. Each of the three protection zones may be divided into one or more partially sealed chambers. For example in one embodiment, the first and second inflatable protection zones are divided into three chambers, and the third protection zone is divided into two chambers.

Each of the three protection zones of the long airbag cushion can be in fluid communication with any adjacent protection zones through a communication channel. Thus, a first communication channel can communicate gas between the first protection zone and the second protection zone, and a second communication channel can communicate gas between the second protection zone and the third protection zone. Each of these communication zones may be located either proximate the top of the airbag cushion, proximate the bottom of the airbag cushion, or someplace in between. The airbag cushion may have four communication channels: first, second, third, and fourth communication channels. The first and third communication channels may communicate gas between the first and second protection zone while the second and fourth communication channels communicate the gas between the second and third protection zones. Each of the four communication channels may be independently positioned adjacent the top of the airbag cushion, adjacent the bottom of the airbag cushion, or at a position in between the top and the bottom.

The long airbag cushion may have an inflation channel that receives pressurized gas from a gas source. Such inflation channels may communicate the pressurized gas into a gas guide. The gas guide can direct a portion of the gas into different sections of the long airbag cushion to aid in the equalization of the gas pressure within the cushion. For example, in certain configurations, the inflation channel may enter the airbag cushion between the B and C pillars of the vehicle. In such configurations it may be advantageous to for the gas guide to direct a portion of the gas toward the rear of the cushion and another portion of the gas toward the front of the cushion.

The inflatable airbag cushion may be formed from a first and second membrane. Each membrane has an interior portion and an exterior portion. The first and second membranes may be secured to each other in order to form each of the protection zones. Generally, the interior portions of one membrane are next to the interior of the other membrane. The communication channels may be adjacent the interior of the membranes. The communication channels may also be positioned adjacent the exterior portion of the membranes. The first and second membranes may each be formed from separate pieces joined together, or they may be formed from a single piece folded to create two portions. The first and second membranes may be attached together in a manner to form the protection zones, connecting zones, and the communication channels. The membranes may be attached by various mechanisms including, but not limited to, mechanical fastening, sewing, weaving, chemical bonding, adhesive bonding, thermal welding, sonic welding, RF welding, and electromagnetic welding.

BRIEF DESCRIPTION OF THE DRAWINGS

A more particular description of the invention briefly described above will be rendered by reference to specific embodiments thereof which are illustrated in the appended drawings. These drawings depict only typical embodiments of the invention and are not therefore to be considered to be limiting of its scope. The invention will be described and explained with additional specificity and detail through the use of the accompanying drawings.

DETAILED DESCRIPTION OF THE INVENTON

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

The present invention provides a system by which the pressure within the protection zones may be equalized. A system of passageways, in the form of communication channels between the protection zones, may provide for rapid equalization of pressure within the protection zones. The equalization of pressure allows for generally uniform inflation of the cushion. These principles will be shown and described in greater detail in conjunction with the following description and the accompanying figures.

Figure 1:
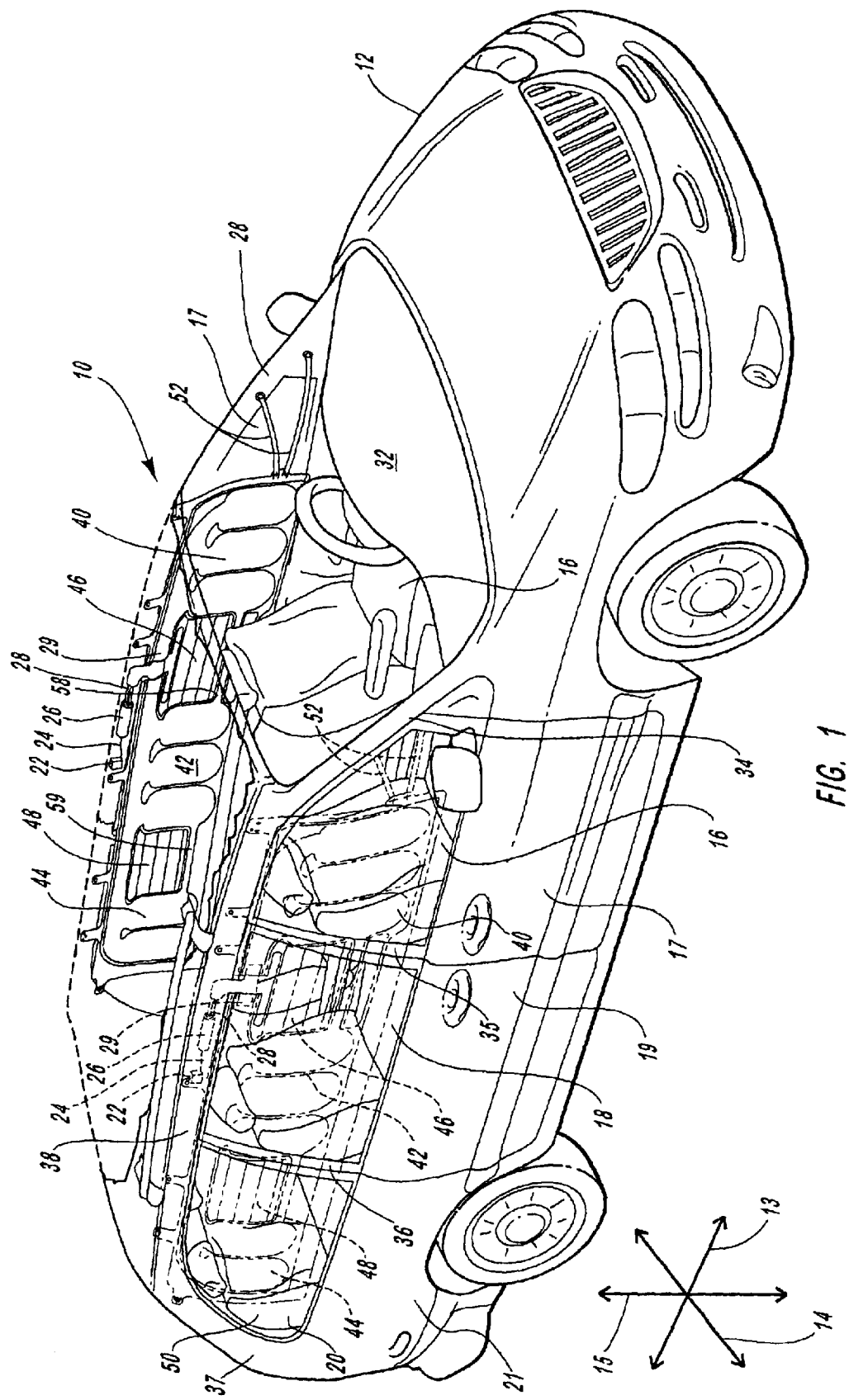
FIG. 1 is a perspective view of a vehicle incorporating one embodiment of a pressure equalizing inflatable airbag cushion according to the invention.

Referring to FIG. 1, two cushions 10 are shown installed in a vehicle 1. The cushions 10 may each form part of an inflatable curtain module, or an airbag system configured to protect vehicle occupants against lateral impact or rollover. The vehicle 12 has a longitudinal direction 13, a lateral direction 14, and a vertical direction 15. The vehicle 12 further has front seats 16 laterally displaced from first lateral surfaces 17, or front doors 17, as shown in the vehicle 12 of FIG. 1. The vehicle 12 also has middle seats 18 laterally displaced from second lateral surfaces 19, or rear doors 19, as depicted. Rear seats 20 are laterally displaced from third lateral surface 21, or rear panel 21.

One or more accelerometers 22 or other similar impact sensing devices detect sudden lateral acceleration (or deceleration) of the vehicle 12 and transmit electric signals via electric lines 24 to one or more sources of pressurized gas 26, or inflators 26. FIG. 1 shows two inflators 26, each inflator 26 configured to inflate a different cushion 10. But in other configurations, a single inflator 26 may be used to inflate both of the cushions 10.

The inflator 26 may take the form of a hollow pressure vessel containing a chemically reactive material and/or compressed gas that can be activated or released upon application of electricity to provide an outflow of inflation gases. Each cushion 10 may have a gas channel 28 to convey the inflation gases from the inflator 26 to the cushion 10. The inflator 26 may operate with such rapidity that, before the vehicle 12 has fully reacted to the impact, the cushions 10 have inflated to protect vehicle occupants from impact.

The inflators 26 may be stowed within a roof 30 of the vehicle 12, as shown in FIG. 1. Each of the gas channels 28 is disposed along one of the A pillars 34 of the vehicle 12 to reach the cushions 10. In the alternative, each cushion 10 may have its own inflator 26 positioned directly fore or aft of the cushion 10. For example, the inflators 26 may be disposed along roof rails 38 of the vehicle 12 in back of the cushions 10, or along the A pillars 34 in front of the cushions 10. In such a case, shorter gas channel 28 may be used to convey inflation gases to the cushions10. The inflator 26 may alternatively be positioned between the B pillar 35 and the C pillar 36 or between the C pillar 36 and the D pillar 37. With the inflator 26 positioned closer to the airbag cushion 10, the compressed gas requires a shorter amount of time to reach and inflate the cushion 10. Moreover, a centrally mounted inflator requires less time to package and mount in a vehicle than inflators 26 positioned distantly from the airbag cushion 10.

As depicted in FIG. 1, each of the cushions 10 is installed along one of the roof rails 38. The cushions 10 shown in FIG. 1 are configured to protect not only occupants of the front seats 16, but those of the middle 18 and rears seats 20 as well. Thus, each cushion 10 may have a first protection zone 40 configured to inflate between the front seats 16 and one of the front doors 17, a second protection zone 42 configured to inflate between the middle seats 18 and one of the rear doors 19, and a third protection zone 44 configured to inflate between the rear seats 20 and one of the rear panels 21.

The first, second, and third protection zones 40, 42, 44 of each cushion 10 may be attached together through the use of connection zones 46, 48. For example in one embodiment, the first and second protection zones 40, 42 are joined by a first connection zone 46, and the second and third protection zones 42, 44 are joined by a second connection zone 48. The first connection zone 46 may be longitudinally positioned between the front seats 16 and the middle seats 18, and the second connection zone may be longitudinally positioned between the middle seats 18 and the rear seats 20. The connection zones 44 need not be configured to provide impact protection for occupants of the vehicle 12. Each cushion 10 may have one or more tethers 52 or similar anchoring devices 52 attached to the roof rail 38, the A pillar 34, and/or other components of the vehicle 12 to exert tension on the cushions 10 to keep them in place during inflation and impact.

Although each cushion 10 in FIG. 1 has three protection zones 40, 42, the invention encompasses the use of cushions with at least two protection zones. Thus, if desired, the third protection zones 44 and second connection zones 48 may be omitted to leave only the first and second protection zones 40, 42 joined by the first connection zone 46. Alternatively, in larger vehicles such as busses, mini busses, and passenger vans with four or more rows of seats, each of the cushions 10 may be extended to have protection zones positioned to protect occupants from impact against lateral surfaces of the vehicle 12 in any and all of the rows of seats behind the rear seats 20.

The cushions 10 each have a considerable length in the longitudinal direction 13, particularly in embodiments such as that of FIG. 1, in which each cushion 10 has multiple protection zones 40, 42, 44. If each cushion 10 is only fed by a single inflator, as shown in FIG. 1, inflation gases must travel a considerable distance to traverse the cushion 10. With continued reference to the exemplary embodiment of FIG. 1, the present invention provides a method and apparatus whereby the gas pressure within the protection zones 40, 42, 44 can rapidly equalize. The rapid equalization of pressure within the protection zones 40, 42, 44 results in the substantially uniformly inflation of the protection zones.

"Substantially uniform" inflation need not be precisely simultaneous inflation of the first, second, and third protection zones 40, 42, 44. Rather, substantially uniform inflation simply requires that the difference in inflation times between the protection zones 40, 42, 44 is small enough that all protection zones 40, 42, 44 deploy in time to provide impact protection. Substantially uniform inflation along the length of the cushion 10 will be understood to exclude portions of the cushion 10 that do not provide significant protection for vehicle occupants, such as the connection zones 46, 48. The manner in which the cushions 10 are configured to provide for rapid equalization of pressure within the protection zones will be further illustrated and described in connection with FIG. 2.

Figure 2:
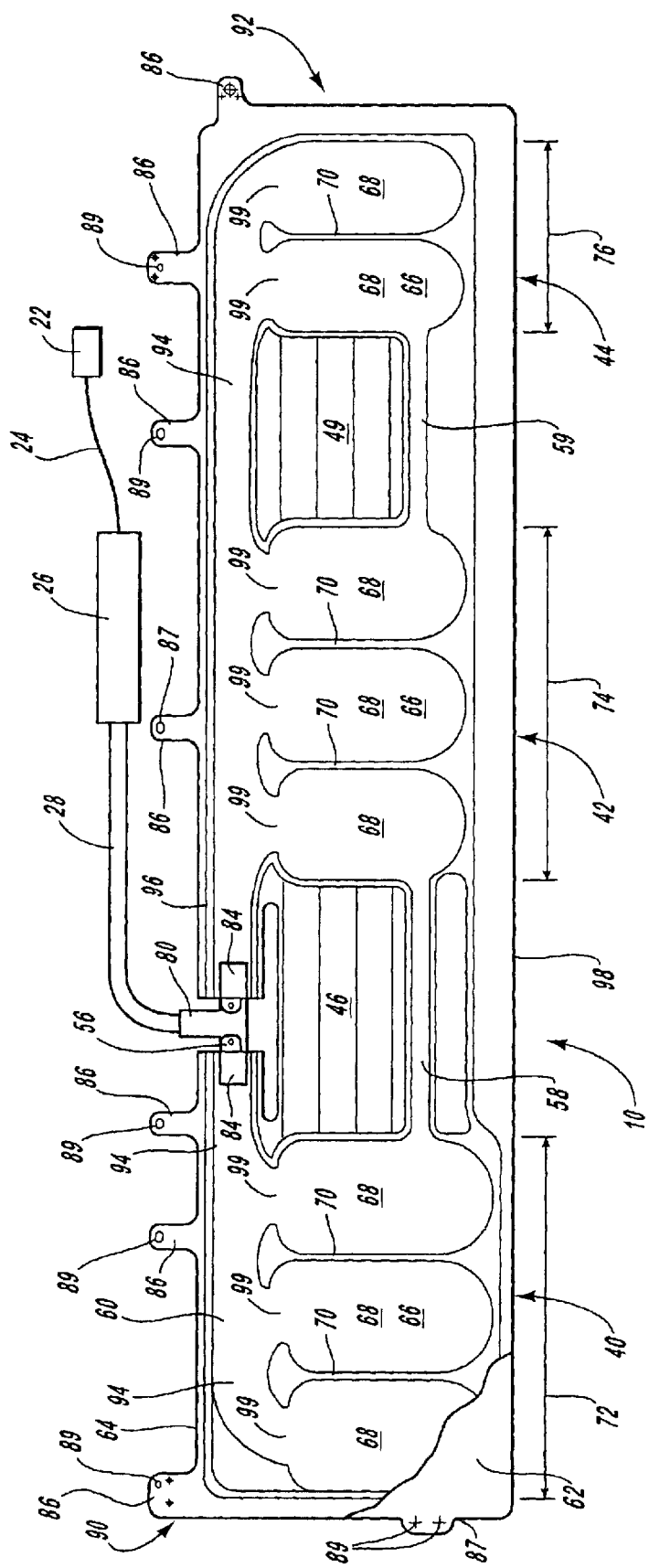
FIG. 2 is a side elevation, section view of the cushion of FIG. 1, with communication channels adjacent the bottom the airbag cushion.

Referring to FIG. 2, a side elevation, section view of one of the cushions 10 of FIG. 1 is depicted. The cushion 10 may be produced using "lay flat" construction, in which the cushion 10 is constructed largely of flat, symmetrical elements affixed together. The cushion 10 may, for example, have a first membrane 60 and a second, similarly shaped membrane 62, only a portion of which is shown in FIG. 2. The first and second membranes 60, 62 may be formed from flexible, substantially gas-impermeable material, such as fabrics. Each of the membranes 60, 62 may have an outer edge 64 extending generally around a circumference of the membrane 60, 62. The outer edges 64 of the membranes 60, 62 may substantially encircle an interior portion 66 for each of the protection zones 40, 42, 44.

The interior portion 66 of each of the protection zones 40, 42, 44 may be divided into a plurality of chambers 68, each of which is oriented substantially upright. The chambers 68 of each protection zone 40, 42, 44 may be divided from each other through the use of chamber dividers 70, which may take the form of interior seams 70 formed by attaching the first and second membranes 60, 62 together between the chambers 68 through weaving, sewing, bonding, RF welding, or the like. Extra fabric seams, polymer coatings, or the like may be used to form the interior seams 70 with the selected attachment method.

As mentioned previously, the cushion 10 may be manufactured through lay flat construction. According to lay flat construction, the first and second membranes 60, 62 may be made separately of a flexible material such as a fabric, and laid together, one on top of the other. In the alternative, the first and second membranes 60, 62 may be portions of a single piece of fabric folded together; the present invention contemplates both unitary and separate membranes 60, 62.

After the membranes 60, 62 have been properly aligned, the outer edges 64 of the first and second membranes 60, 62 may be attached together to effectively enclose the interior portions 66, aside from space for inflation gas inlet 56. Each interior portion 66 then forms a protection zone 40, 42, 44 capable of holding inflation gas, as least for a period of time sufficient to provide impact protection.

The outer edges 64 may be attached through the use of a first attachment mechanism, which may be any attachment mechanism suitable for attaching two flexible portions of material together. For example, the first attachment mechanism may comprise mechanical fastening, sewing, weaving, chemical or adhesive bonding, thermal, sonic, or electromagnetic welding, or the like. For example, "one piece woven" technology may be utilized to affix the membranes 60, 62 together through the use of fibers from one or both of the membranes 60, 62.

Alternatively, RF welding may be utilized to affix the membranes 60, 62 through the application of radio frequency electromagnetic radiation. RF welding works exceptionally well with urethane-based materials (materials having a significant urethane content); thus, if RF welding is used, the first and second membranes 60, 62 may be either constructed of or coated with a urethane-based substance.

The first protection zone 40 may have a length 72 defined as the length of the interior portion 66 of the first protection zone 40 in the longitudinal direction 33. Similarly, the second and third protection zones 42, 44 may have lengths 74, 76 defined as the length of the interior portion 66 of the respective protection zone 42, 44 in the longitudinal direction 33.

The cushion 10 may have one or more inflation ports 84, through which the cushion 10 receives inflation gases from the gas channel 28. For example in the illustrated embodiment, a T-shaped gas guide 80 is provided within the inflation gas inlet 56 of the cushion 10. The gas guide 80 directs a portion of the inflation gas received from the gas channel 28 into each of the inflation ports 84. In the alternative, the inflator 26 may be disposed directly within the inflation gas inlet 56, so that no gas channel 28 is necessary. The gas guide 80 may be configured to direct a smaller portion of the gas toward the front 90 of the airbag cushion 10 than toward the rear 92 of the airbag cushion 10. For example, in the embodiment of FIG. 2, the gas guide 80 is positioned between the first protection zone 40 and the second protection zone 42. Thus, in the absence of the gas guide 80, an equal portion of the gas will initially flow toward the front 90 of the cushion 10 and the rear 92 of the cushion 10 creating a higher initial pressure in the first protection zone 40 than in the second and third protection zones 42, 44. When the gas guide 80 is configured to direct a larger portion of the gas toward the rear 92 of the cushion 10, the pressure will initially be more equal.

The cushion 10 may have one or more vehicle attachment flaps 86 by which the cushion 10 can be installed in the vehicle 12. The vehicle attachment flaps 86 may have one or more holes 88 so that fasteners such as bolts, nuts, rivets, flexible plastic parts, or the like can be used to affix the vehicle attachment flap 86 to the roof rail 38. The cushion 12 may also have one or more tether attachment flaps 87 by which the cushion 10 may be held in position during deployment of the cushion 10. The tether flaps 87 may have tether attachment points 89. The tethers 52 may be attached to the tether flaps by for example, a knot, a rivet, a bolt, and the like.

An inflation channel 94 may be positioned along the top 96 of the airbag cushion 10. As gas is released from the inflator 26, it flows through the gas channel 28 to the inflation gas inlet 56. From the inflation gas inlet 56, the gas enters the inflation port 84 and flows into the inflation channel 94. Where a gas guide 80 is desired, the gas guide 80 can be connected to the inflation channel 94. The inflation channel 94 allows the gas to flow from the inflation port 84 to the protection zones 40, 42, 44. The inflation channel 94 may be formed by the membranes 60, 62. Alternatively, the inflation channel 94 may be formed from a tube or other material attached to one or both of the membranes. The inflation channel 84, and may extend substantially along the length of the airbag cushion 10.

Outlets 99 may be formed within the inflation channel 94 to allow the pressurized gas to flow into and inflate the protection zones 40, 42, 44. In the illustrated embodiment, each outlet 99 is positioned adjacent one of the chambers 68. Such a configuration may expedite inflation by providing a comparatively direct path for gas flows to enter the chambers 68.

Because the pressurized inflation gas may buildup in the protection zones 40, 42, 48, the pressure in each of the protection zones vary substantially. This variance in pressure may cause the protection zones of the airbag cushion 10 to inflate in non-uniform manner. To prevent the gas buildup and to encourage uniform inflation of the protection zones, communication channels 58, 59 may be provided that allow the flow of gas between the protection zones. The communication channels 58, 59 are positioned distantly from the inflation channel 94 and the outlets 99. For example in the embodiment of FIG. 2, a first communication channel 58 is formed within the first connecting zone 46. The first communication channel 58 enables the inflation gas to flow between the first and second protection zones 40, 42. A second communication channel 59 may also be provided to permit the flow of gas between the second and third protection zones 42, 44.

The communication channels 58, 59 may be positioned in a number of places on the airbag cushion 10 provided that the communication channels do not correspond to the inflation channel 94. For example, in the embodiment of FIG. 2, the inflation channel 94 is positioned proximate the top 96 of the cushion 10 while the communication channels 58, 59 are within the connection zones 46, 48 near the bottom 98 of cushion 10. The communication channels 58, 59 can be formed by channels between the two membranes 60, 62. Alternatively the communication channels 58, 59 formed by channels external to the membranes 60, 62.

Figure 3:
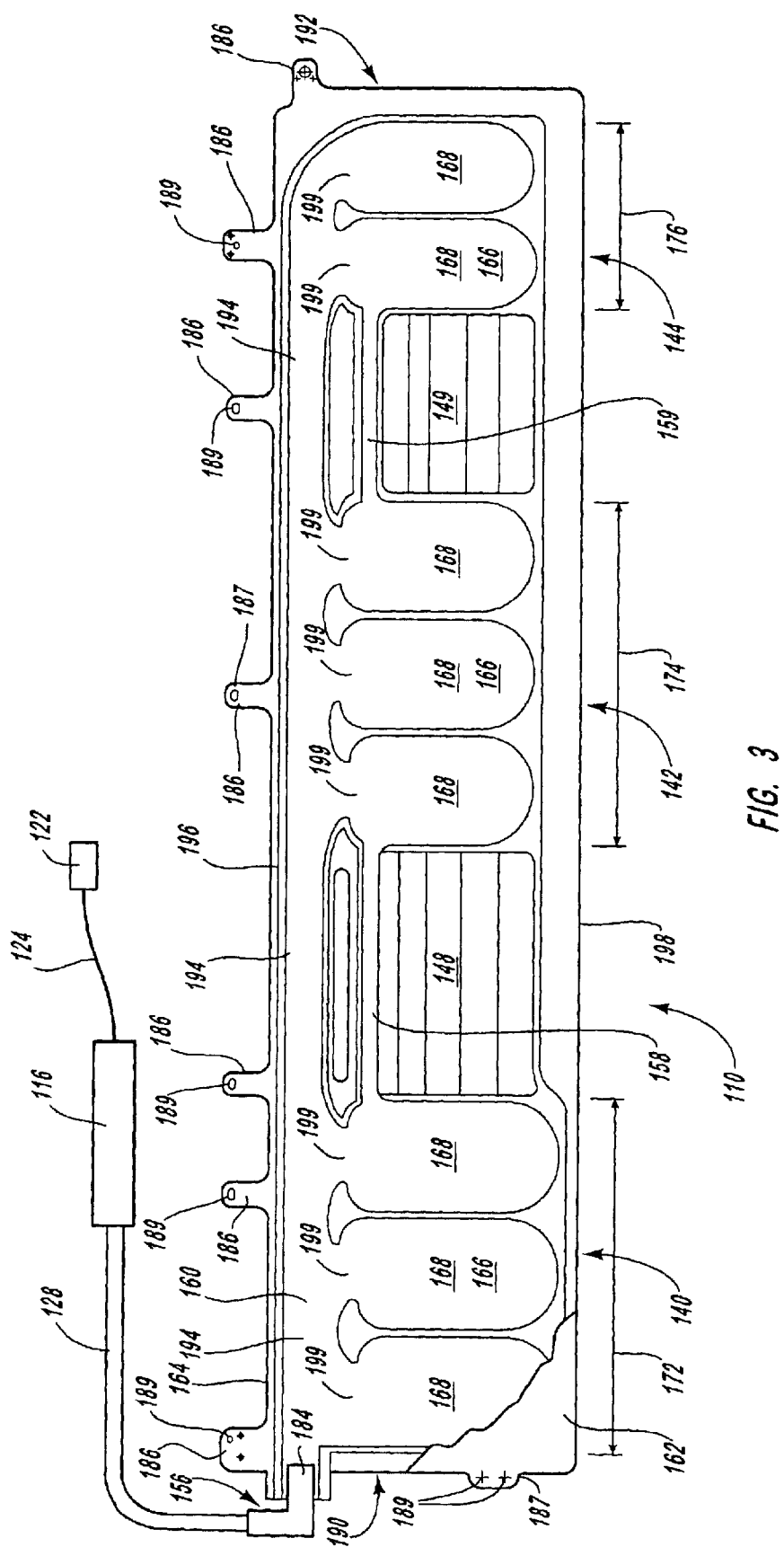
FIG. 3 is a side elevation, section view of an alternative embodiment of the airbag cushion, with communication channels adjacent the top of the airbag cushion.

Referring now to FIG. 3, an alternative embodiment of an airbag cushion 110 of the present invention is presented. The airbag cushion has a first protection zone 140, a second protection zone 142, and a third protection zone 144. The protection zones 140, 142, 144 are configured to protect a passenger from lateral impact when seated in the front, middle, and rear seats 16, 18, 20, respectively. The first and second protection zones are separated by a first connection zone 148, and the second and third protection zones are separated by a second connection zone 149. The connection zones 148, 149 seal the protection zones 140, 142, 144 allowing the protection zones to inflate when filled with pressurized gas. Each of the protection zones 140, 142, 144 is divided into two or more chambers 168 by chamber dividers 170.

Like the embodiment of FIG. 2, the airbag cushion 110 is configured to be inflated by pressurized inflation gas from a source of pressurized gas or inflator 116. The inflator 116 is activated when an accelerometer 122 detects a crash scenario and sends a signal to the inflator 116 via the electronic line 124. The inflator releases pressurized gas into gas channel 128. The gas enters the airbag cushion through the inflation gas inlet 156. The gas inlet 156 maybe for example in the front 190 of the airbag cushion 110. An inflation port 184 is located within the gas inlet 156 and is connected to an inflation channel 178. The inflation channel has a series of outlets 199 which release the pressurized gas into the chambers 168 of the protection zones 140, 142, 144.

With the gas inlet 156 located near the front 190 of the airbag cushion, a greater portion of the gas may enter the first protection zone 140 than enters the second and third protection zones 142, 144. The unequal pressure may cause the airbag cushion 110 to inflate in a non-uniform manner. A first communication channel 158 may be configured to communicate the inflation gas between the first and second protection zones 140, 142, and a second communication channel 159 may be configured to communicate the inflation gas between the second and third communication zones 142, 144. The communication channels 148, 149 do not correspond to the inflation channel 194 and provide additional communication of the inflation gas between the protection zones that is not provided by the inflation channel 194. The additional communication of the gas between the protection zones 140, 142, 144 allows for the pressure within the protection zones 140, 142, 144 to rapidly equalize resulting in a generally uniformly inflated airbag cushion 110. In the embodiment of FIG. 3, the communication channels 158, 159 are positioned within the connection zones 148, 149 near the top 196 of the airbag cushion 110. The communication channels 148, 149 do not correspond to the inflation channel 194.

Figure 4:
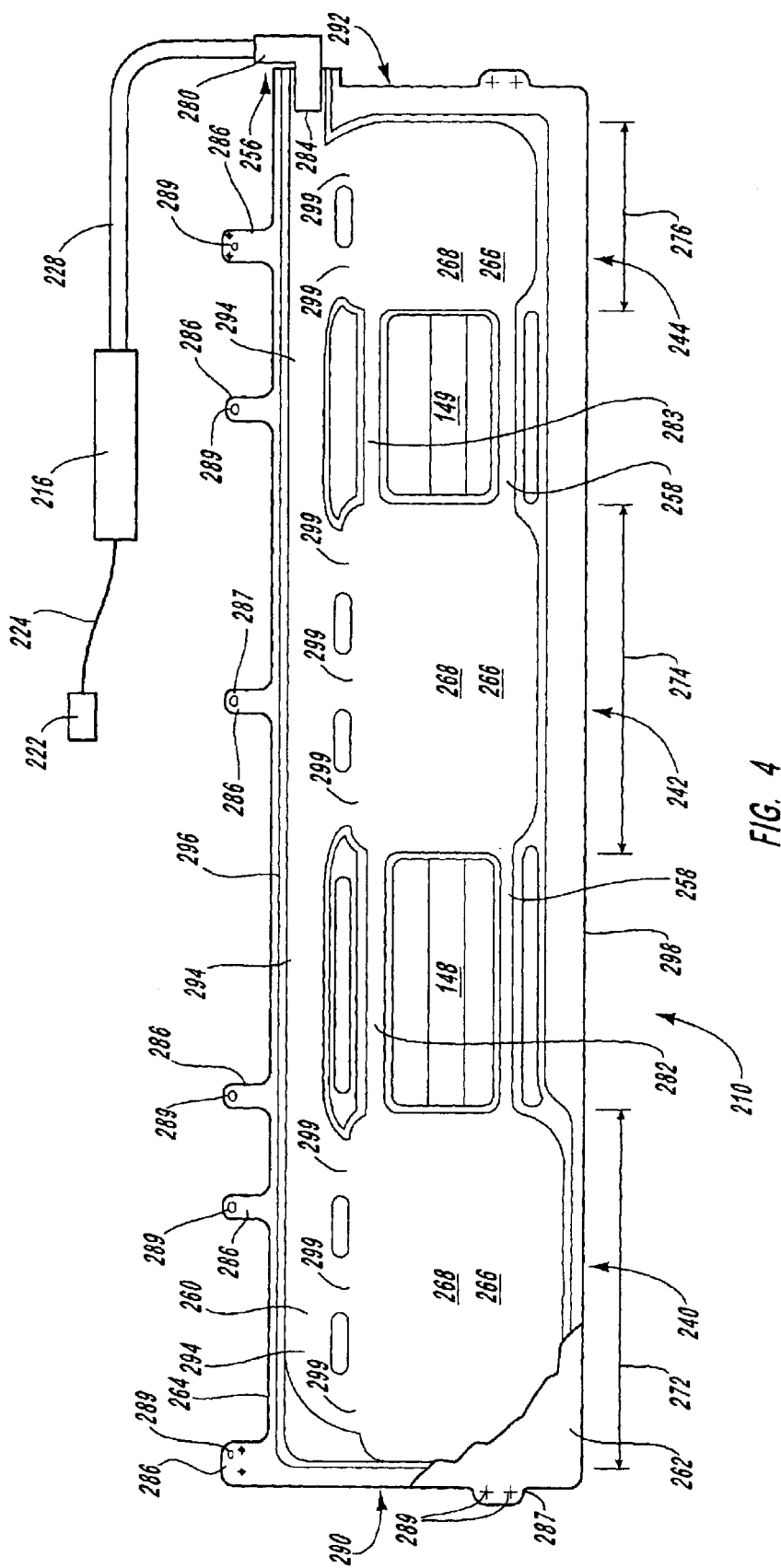
FIG. 4 is a side elevation, section view of an alternative embodiment of the airbag cushion, with communication channels adjacent both the top and the bottom of the airbag cushion.

Referring now to FIG. 4, an alternative embodiment of an airbag cushion 210 of the present invention is presented. The airbag cushion has a first protection zone 240, a second protection zone 242, and a third protection zone 244. The protection zones 240, 242, 244 are configured to protect a passenger seated in the front, middle, and rear seats 16, 18, 20, respectively, from lateral impact. The first and second protection zones 240, 242 are separated by a first connection zone 248, and the second and third protection zones 242, 244 are separated by a second connection zone 249. The connection zones 248, 249 seal the protection zones 240, 242, 244 allowing the protection zones to inflate when filled with pressurized gas.

Like the embodiments of FIGS. 2 and 3, the airbag cushion 210 is configured to be inflated by pressurized inflation gas from a source of pressurized gas or inflator 216. The inflator 216 is activated when an accelerometer 222 detects a crash scenario and sends a signal to the inflator 216 via the electronic line 224. The inflator releases pressurized gas into gas channel 228. The gas enters the airbag cushion 210 through the inflation gas inlet 256. The gas inlet 256 may be located, for example, near the rear the front 292 of the airbag cushion 210. An inflation port 284 is located within the gas inlet 256 and is connected to an inflation channel 278. The inflation channel 278 has a series of outlets 299 which release the pressurized gas into protection zones 140, 142, 144. In the embodiment of FIG. 4, the protection zones 240, 242, 244 each only have one chamber 268. However, it will be appreciated that multiple chamber 268 may be used.

With the gas inlet 256 located near the rear 290 of the airbag cushion, a greater portion of the gas may enter the third protection zone 240 than enters the first and second protection zones 240, 242. The unequal pressure may cause the airbag cushion 210 to inflate in a non-uniform manner. A first communication channel 258 may be configured to communicate the inflation gas between the first and second protection zones 240, 242, and a second communication channel 259 may be configured to communicate the inflation gas between the second and third communication zones 242, 244. The communication channels 248, 249, 282, 283 do not correspond to the inflation channel 294 and provide additional communication of the inflation gas between the protection zones that is not provided by the inflation channel 294. Additionally, third and fourth communication channels 282, 283 may be used to convey the inflation gas between the first and second protection zones 240, 242 and the second and third protection zones 242, 244 respectively. The additional communication of the gas between the protection zones 240, 242, 244 allows for the pressure within the protection zones 240, 242, 244 to rapidly equalize resulting in a generally uniformly inflated airbag cushion 210. In the embodiment of FIG. 4, the first and second communication channels 258, 259 are positioned within the connection zones 248, 249 near the bottom 296 of the airbag cushion 210, and the third and fourth communication channels 282, 283 are located within the connection zones 248, 249. In other embodiments, the communication channels may be located near the center of the airbag cushion 210. The communication channels 258, 259, 282, 283 may also be located externally to the connection zones 248, 249.

Experimental Results

Figure 5:
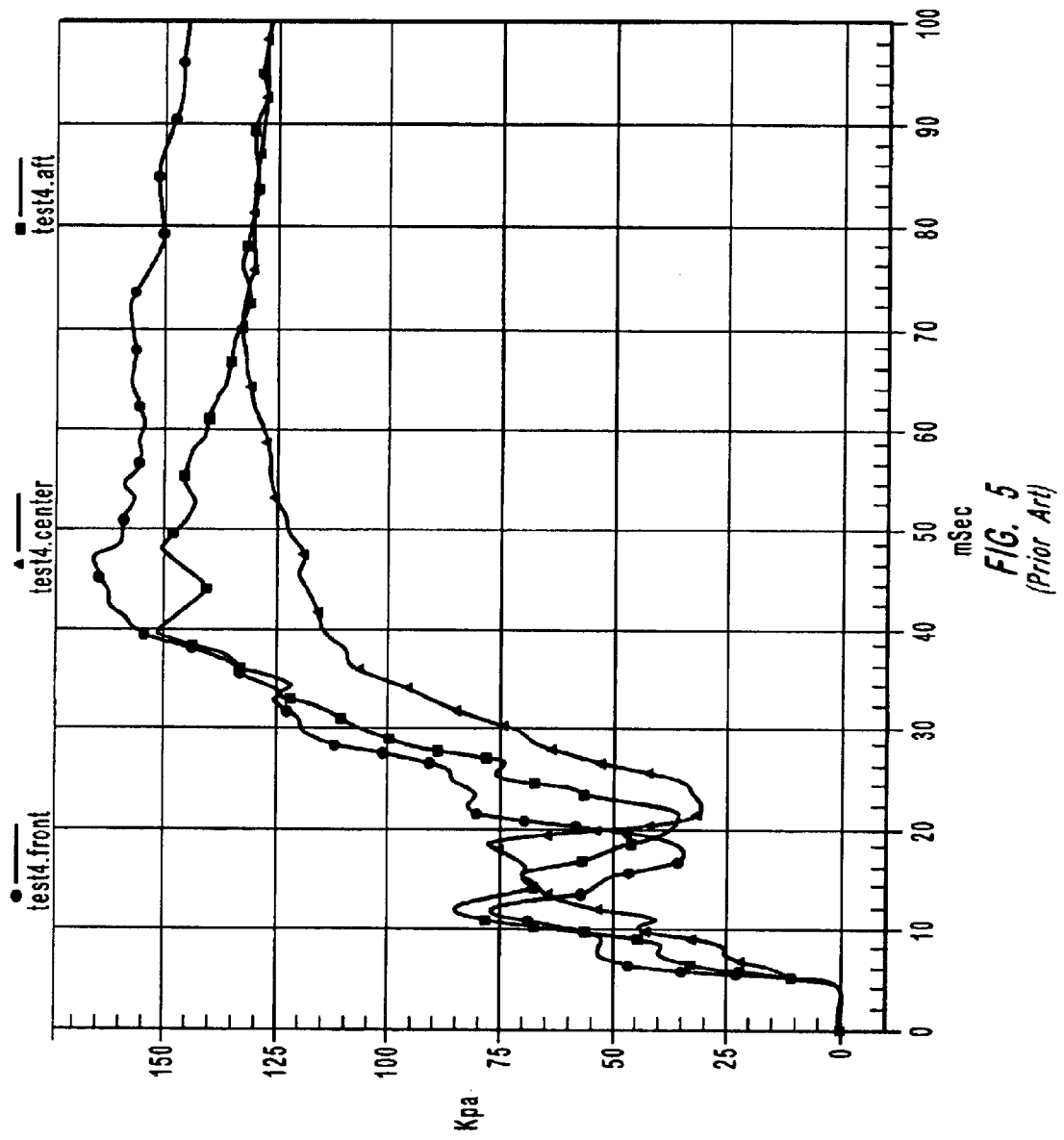
FIG. 5 is a graph illustrating a pressure trace of a standard airbag cushion with three protection zones. Circles represent the pressure within the front protection zone, triangles represent the pressure within the center protection zone, and squares represent the pressure within the rear protection zone.

Referring to FIG. 5, a pressure trace of an airbag cushion having three protection zones is presented. The airbag cushion does not have communication channels such as the airbag cushions of the present invention. The black circles represent the pressure within the first protection zone which protects occupants of the front seat. The black triangles represent the pressure within the second protection zone which protects the occupants of the middle seat. The black squares represent the pressure within the third protection zone which protects the occupants of the back seat. The pressure is given in kilo Pascals and the time is in milliseconds.

As seen in FIG. 5, the pressure within the first protection zone rises more quickly than the other protection zones and reaches a peak pressure of about 165 Kpa. The pressure of the rear third protection zone initially reaches a pressure of about 150 Kpa, but rapidly drops to a pressure of about 130 Kpa. The pressure of the second protection zone is much slower to rise than the other protection zones, but eventually reaches a substantially equal pressure with the third protection zone. The time for pressure of the second and third protection zones to equalize is about 70 mSec. However within the 100 mSec shown in the graph, the pressure of the first protection zone does not equalize with the other two protection zones. This disparity in pressure and lack of equalization can cause the airbag to inflate unequally and to malfunction.

Figure 6:
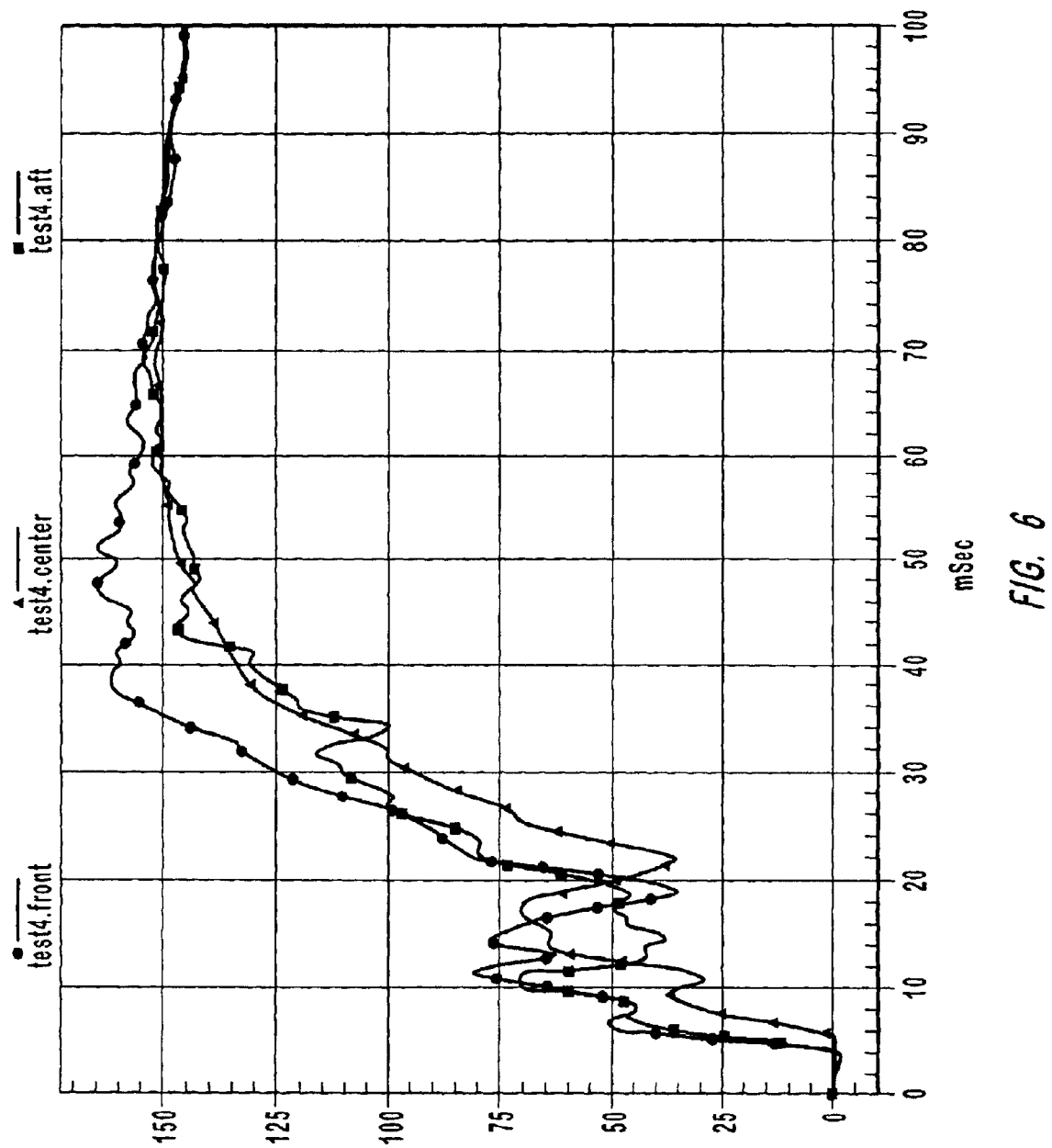
FIG. 6 is a graph illustrating a pressure trace of a pressure equalizing airbag cushion of the present invention with three protection zones. Circles represent the pressure within the front protection zone, triangles represent the pressure within the center protection zone, and squares represent the pressure within the rear protection zone.

Referring now to FIG. 6, a pressure trace of an airbag cushion of the present invention is presented. The airbag cushion has three protection zones and communication channels to communicate the inflation gas between the protection zones and the airbag inflates. The black circles represent the pressure within the first protection zone which protects occupants of the front seat. The black triangles represent the pressure within the second protection zone which protects the occupants of the middle seat. The black squares represent the pressure within the third protection zone which protects the occupants of the back seat. The pressure is given in kilo Pascals and the time is in milliseconds.

As seen in FIG. 6, the pressure within the first protection zone raises somewhat more quickly than the pressure of the other protection zones. However the pressure of the second and third protection zones rises much more quickly in FIG. 6 than in FIG. 5. Additionally while the maximum pressure of the first protection zone reaches about 165 Kpa, the maximum pressure of the second and third protection zones reaches about 155 Kpa. Thus, the maximum pressure within the protection zones is substantially equal as compared to the pressure of the cushion used in FIG. 5.

The pressure within the protection zones of the airbag of the present invention quickly equalizes as compared to the airbag cushion without communication channels. The pressure within the second connection zones is substantially equal at about 32 mSec as compared to about 70 mSec in FIG. 5. Moreover, the pressure of all protection zones begins equalizes at about 60 mSec and does not equalize in the cushion of FIG. 5. At about 70 mSec the pressure in all protection zones is substantially equal. This rapid equalization of pressure within the airbag cushion of the present invention aids in the uniform inflation of the airbag cushion. Moreover, because a crash may take a small fraction of a second, the rapid inflation of all protection zones may enable the airbag to better prevent injury to a passenger.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. An airbag cushion, having a top and a bottom, comprising:
    at least two inflatable protection zones, each of which comprises a plurality of chambers longitudinally displaced from each other;
    an inflation channel for receiving pressurized gas from a source of pressurized gas
    at least one connecting zone connecting one of the at least two inflatable protection zones to another inflatable protection zone, wherein a majority of the at least one connecting zone does not permit air flow between the at least two inflatable protection zones; and
    a plurality of communication channels, each of which is disposed within a connecting zone, each communication channel communicating the pressurized gas between two of the inflatable protection zones, wherein each of the communication channels is longitudinally elongated and horizontally oriented.

2. The cushion of claim 1, wherein the at least one communication channel is proximate the bottom of the cushion.

3. The cushion of claim 1, wherein the at least one communication channel is proximate the top of the cushion.

4. The cushion of claim 1, wherein at least one of the inflatable protection zones is joined to a second inflatable protection zone by a first communication channel and a second communication channel.

5. The cushion of claim 4, wherein the first communication channel is proximate the top of the cushion and the second communication channel is proximate the bottom of the cushion.

6. The cushion of claim 1, further comprising a gas guide connected to the inflation channel.

7. The cushion of claim 6, wherein the gas guide is configured to direct a portion of the pressurized gas toward a front end of the cushion and a portion of the pressurized gas toward a rear end of the cushion.

8. The cushion of claim 1, wherein the each of the inflatable protection zones is divided into one or more chambers.

9. The cushion of claim 1, wherein the cushion has a first, a second, and a third inflatable protection zone, the first inflatable protection zone connected to the second inflatable protection zone by a first connecting zone and the second inflatable protection zone connected to the third inflatable protection zone by a second connecting zone.

10. The cushion of claim 9, wherein a first communication channel communicates the pressurized gas between the first inflatable protection zone and the second inflatable protection zone, and a second communication channel communicates the pressurized gas between the second inflatable protection zone and the third inflatable protection zone.

11. The cushion of claim 10, wherein the first communication channel is located proximate the top of the cushion.

12. The cushion of claim 10, wherein the first communication channel is located proximate the bottom of the cushion.

13. The cushion of claim 10, wherein the second communication channel is located proximate the top of the cushion.

14. The cushion of claim 10, wherein the second communication channel is located proximate the bottom of the cushion.

15. An airbag cushion comprising:
a first membrane having an interior portion;
a second membrane having an interior portion, the first and second membranes attachable to form first, second, and third inflatable protection zones between the interior portions of the first and second membranes and to form a first connecting zone between the first and second inflatable protection zones and a second connecting zone between the second and third inflatable protection zones;
an inflation channel configured to receive pressurized gas from a source of pressurized gas, wherein a majority of the first connecting zone does not permit air flow between the first and second inflatable protection zones, and wherein a majority of the second connecting zone does not permit air flow between the second and third inflatable protection zones; and
at least one communication channel disposed within one of the connecting zones to communicate the pressurized gas from one inflatable protection zone to another inflatable protection zone,
wherein the first inflatable protection zone is divided into three chambers, the second inflatable protection zone is divided into three chambers, and the third inflatable protection zone is divided into two chambers.

16. The cushion of claim 15, wherein the at least one communication channel is proximate the bottom of the cushion.

17. The cushion of claim 15, wherein the at least one communication channel is proximate the top of the cushion.

18. The cushion of claim 15, wherein the airbag cushion further comprises a gas guide that is configured to direct a portion of the pressurized gas toward a front end of the cushion and a portion of the pressurized gas toward a rear end of the cushion.

19. The cushion of claim 15, wherein the airbag cushion further comprises a gas guide that is located between the first and second inflatable protection zones.

20. The cushion of claim 19, wherein the gas guide is configured to direct a greater portion of the pressurized gas toward the second and third inflatable protection zones than toward the first inflatable protection zone.

21. The cushion of claim 15, wherein the each of the inflatable protection zones is divided into one or more chambers.

22. The cushion of claim 15, wherein the first and second membranes are attached together via a first attachment mechanism, the attachment mechanism select from the group consisting of mechanical fastening, sewing, weaving, chemical bonding, adhesive bonding, thermal welding, sonic welding, RF welding, and electromagnetic welding.

23. An airbag cushion, having a top and a bottom, for protecting an occupant of a vehicle, the vehicle having pillars A through D, the curtain comprising:
a first inflatable protection zone for protecting a passenger seated between the A and B pillars;
a second inflatable protection zone for protecting a passenger seated between the B and C pillars;
a third inflatable protection zone for protecting a passenger seated between the C and D pillars;
a first connecting zone between the first protection zone and the second protection zone, wherein a majority of the first connecting zone does not permit air flow between the first protection zone and the second protection zone;
a second connecting zone between the second protection zone and the third protection zone, wherein a majority of the second connecting zone does not permit air flow between the second protection zone and the third protection zone;
an inflation channel for receiving pressurized gas from a source of pressurized gas, the inflation channel directing the pressurized gas into each of the protection zones;
a first communication channel disposed within the first connecting zone, the first communication channel communicating the pressurized gas between the first protection zone and the second protection zone, wherein the first communication channel is separated from the inflation channel by a first non-inflatable portion in the first connecting zone; and
a second communication channel disposed within the second connecting zone, the second communication channel communicating the pressurized gas between the second inflatable protection zone and the third inflatable protection zone, wherein the second communication channel is separated from the inflation channel by a second non-inflatable portion in the second connecting zone,
wherein the first and second communication channels are proximate the top of the cushion.

24. The cushion of claim 23, wherein the first and second communication channels are proximate the bottom of the cushion.

25. The cushion of claim 23, further comprising a third communication channel for communicating the pressurized gas from the first inflatable protection zone to the second inflatable protection zone.

26. The cushion of claim 25, wherein the third communication channel is located proximate the top of the cushion.

27. The cushion of claim 25, wherein the third communication channel is located proximate the bottom of the cushion.

28. The cushion of claim 23, further comprising a fourth communication channel for communicating the pressurized gas from the second inflatable protection zone to the third inflatable protection zone.

29. The cushion of claim 28, wherein the fourth communication channel is located proximate the top of the cushion.

30. The cushion of claim 28, wherein the fourth communication channel is located proximate the bottom of the cushion.

31. The cushion of claim 23, further comprising a gas guide connected to the inflation channel.

32. The cushion of claim 31, wherein the gas guide is configured to direct a portion of the pressurized gas toward a front end of the cushion and portion of the pressurized gas toward a rear end of the cushion.

33. The cushion of claim 31, wherein the gas guide is located between the first and second inflatable protection zones.

34. The cushion of claim 33, wherein the gas guide is configured to direct a greater portion of the pressurized gas toward the second and third inflatable protection zones than toward the first inflatable protection zone.

35. The cushion of claim 23, wherein the each of the inflatable protection zones is divided into one or more chambers.

36. The cushion of claim 35, wherein the first inflatable protection zone is divided into three chambers, the second inflatable protection zone is divided into three chambers, and the third inflatable protection zone is divided into two chambers.

* * * * *